United States Patent [19]
Takatori

[11] Patent Number: 5,319,406
[45] Date of Patent: Jun. 7, 1994

[54] PHOTOGRAPHIC FILM CASSETTE HAVING AN OPENABLE SHUTTER

[75] Inventor: Tetsuya Takatori, Kanagawa, Japan

[73] Assignee: Fuji Photo Film Co., Ltd., Kanagawa, Japan

[21] Appl. No.: 980,737

[22] Filed: Nov. 24, 1992

[30] Foreign Application Priority Data

Nov. 25, 1991 [JP] Japan ............... 3-309450

[51] Int. Cl.$^5$ .................................. G03B 17/26
[52] U.S. Cl. ........................ 354/275; 354/277; 242/71.1
[58] Field of Search ............ 354/174, 275, 277; 242/71.1

[56] References Cited

U.S. PATENT DOCUMENTS

| 2,731,894 | 1/1956 | Leitz et al. | 354/275 |
|---|---|---|---|
| 4,221,479 | 9/1980 | Harvey | 354/275 |
| 4,832,275 | 5/1989 | Robertson | 354/275 |
| 4,834,306 | 5/1989 | Robertson et al. | 354/275 |
| 4,962,401 | 10/1990 | Takahashi | 354/275 |
| 5,031,853 | 7/1991 | Jensen | 354/275 |
| 5,083,721 | 1/1992 | Okutsu et al. | 354/275 |
| 5,174,519 | 12/1992 | Oi et al. | 354/275 |
| 5,187,531 | 2/1993 | Ozawa et al. | 354/275 |
| 5,200,777 | 4/1993 | Zander | 354/275 |

FOREIGN PATENT DOCUMENTS 0064533 3/1990 Japan ............... 354/275
3376345 2/1991 Japan .

Primary Examiner—Michael L. Gellner
Assistant Examiner—Eddie C. Lee
Attorney, Agent, or Firm—Sughrue, Mion, Zinn, Macpeak & Seas

[57] ABSTRACT

A photographic film device includes a cassette shell with a chamber and a spool contained rotatably in the cassette shell. When a spool is rotated, a film leader of a photographic film in the chamber is advanced out of the cassette shell through a film passageway and a film passage mouth. A shutter is provided so as to traverse the film passageway. The shutter is retained by a lock member in a closed position wherein the shutter closes the film passage mouth light-tightly. A separation claw is formed on the shutter so as to peel off the film leader from a film roll. When the photographic film cassette is loaded into a camera, the lock member is first shifted into an unlock position and then the shutter is moved from the closed position into an opened position wherein the photographic film is allowed to pass through the film passageway.

19 Claims, 6 Drawing Sheets

PHOTOGRAPHIC FILM CASSETTE HAVING AN OPENABLE SHUTTER

BACKGROUND OF THE INVENTION

1. Field of the Invention

The present invention relates to a photographic film cassette and more particularly to a photographic film cassette in which a leading end of a photographic film is advanced by rotation of a spool to the outside of the photographic film cassette after a cover of the cassette has been opened.

2. Description of the Related Art

In U.S. Pat. Nos. 4,834,306 and 4,832,275, there are disclosed photographic film cassettes in which a photographic film is completely contained, in the form of a roll, in a cassette shell. When a spool is rotated in the cassette shell, the leading end of the film is advanced out of the cassette shell.

The cassette shell has ridges or the like formed on an inside surface thereof to restrict loosening of the roll of photographic film. A separation claw is formed on the innermost portion of the film passage mouth integrally with the inside surface of the cassette shell so as to contact the outermost turn of the roll of the photographic film. When the roll of photographic film rotates together with the spool and the leading end reaches a position proximate the film passage mouth, the leading end is peeled from the roll by the separation claw and advanced through the film passage mouth to the outside of the cassette shell.

In addition to the film advancing function, photographic film cassettes which are provided with an openable cover member so as to prevent ambient light from entering through a film passage mouth are also known, as in U.S. application Ser. No. 07/548,520 (corresponding to Japanese Laid-open Publication No. 3-37645).

However, such a known cover is merely a plate attached by a hinge to a cassette shell. Accordingly, the known cover can be easily opened due to vibrations and impact occurring during transportation from the factory. Also, when conventional photographic film cassettes are subjected to high temperatures, the photographic film acquires a strong curling tendency. In this case, the separation claw cannot reliably peel off the leading end from the roll of photographic film, thus causing the spool to idly rotate together with the roll of photographic film. Even when the separation of the leading end is successful, the curled leading end of the film may enter into a gap between the cassette shell and the cover member.

SUMMARY OF THE INVENTION

It is an object of the present invention to provide a photographic film cassette having a shutter which will not undesirably open due to impact or vibration.

It is further an object of the present invention to provide a photographic film cassette in which a leading end of a roll of photographic film can be reliably peeled off from the roll even when the film is curled.

It is another object of the present invention to provide a photographic film cassette in which a curled leading end of a roll of photographic film is prevented from entering a gap, defined between a cassette shell and a shutter, after its separation from the roll.

It is still another object of the present invention to provide a photographic film cassette in which a shutter for closing a film passage mouth is easily unlocked by a mechanism of a camera.

The above and other objects can be achieved by providing a film passageway of a film cassette with a shutter which is capable of shifting between a closed position and an opened position. When the shutter is located in the closed position, it shields light from entering a film housing through a film passage mouth. When the shutter is located in the opened position, it defines a portion of the film passageway to allow a photographic film to pass through the film passageway. The shutter is biased by a resilient member to be in the closed position.

In a preferred embodiment, a stripper claw is formed integrally with the shutter so as to peel off a leading end of the photographic film from the film roll. Furthermore, a lock member, which can be actuated from outside of the cassette shell, is provided for retaining the shutter in the closed position. The lock member is urged by a resilient member to lock the shutter in the closed position.

The leading end of the photographic film is cut diagonally and its protruded portion comes into contact with the separation claw. The juncture between a lower wall of the film passage mouth and the shutter, at a portion thereof proximate the separation claw, intersects an advancing direction of the photographic film in an oblique manner.

According to the present invention, the shutter will not be inadvertently opened, since the shutter and the lock member are always urged by the resilient members to maintain the shutter in the closed position. Further, the shutter is easily unlocked by a simple release mechanism of the camera. Also, the separation claw is integrally formed with the shutter and is brought into contact with the film roll according to movement of the shutter, so that the leading end can be reliably peeled off from the film roll even when the film roll has a strong tendency to curl. Furthermore, the juncture between the shutter and the outside wall of the recess is slanted at a portion where the leading end of the photographic film passes, so that the leading end will not fall in the gap therebetween, resulting in smooth advancement of the photographic film.

BRIEF DESCRIPTION OF THE DRAWINGS

The above objects and advantages of the present invention will become more apparent from the following detailed description when read in connection with the accompanying drawings, in which.

DETAILED DESCRIPTION OF THE PREFERRED EMBODIMENTS

Figure 1:
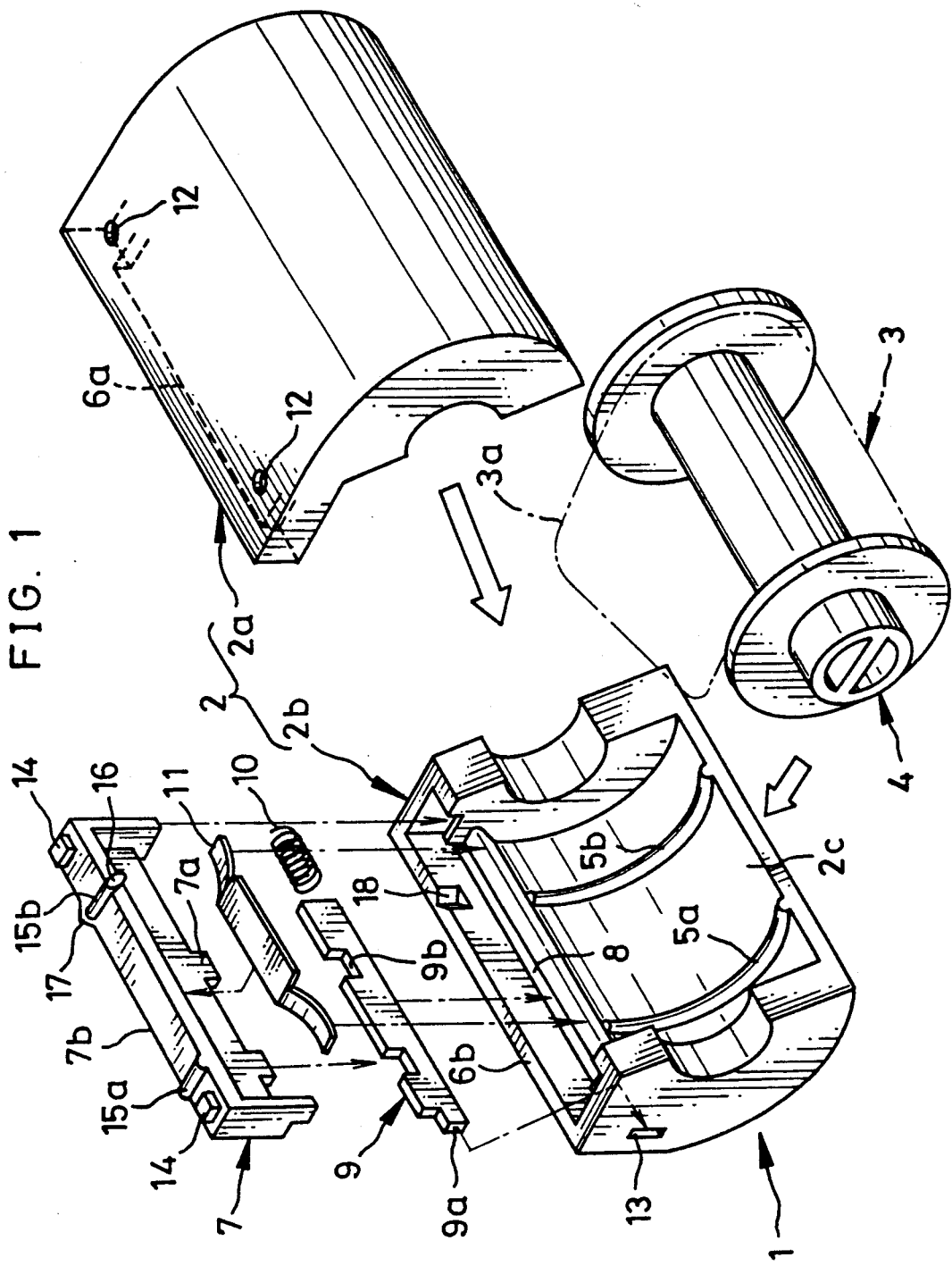
FIG. 1 is an exploded perspective view of a photographic film cassette of the first preferred embodiment of the present invention.

In FIG. 1 illustrating a photographic film cassette 1 according to the first preferred embodiment, a cassette shell 2 consists of upper and lower shell halves 2a and 2b molded of plastic. The cassette shell 2 has a chamber 2c defined therein which rotatably contains a spool 4 having a photographic film 3 wound thereon in a roll. The upper and lower shell halves 2a and 2b have ridges 5a, 5b formed integrally on inside surfaces thereof. The ridges 5a, 5b contact the outermost turn of the roll of photographic film 3 so as to prevent it from loosening.

Figure 2:
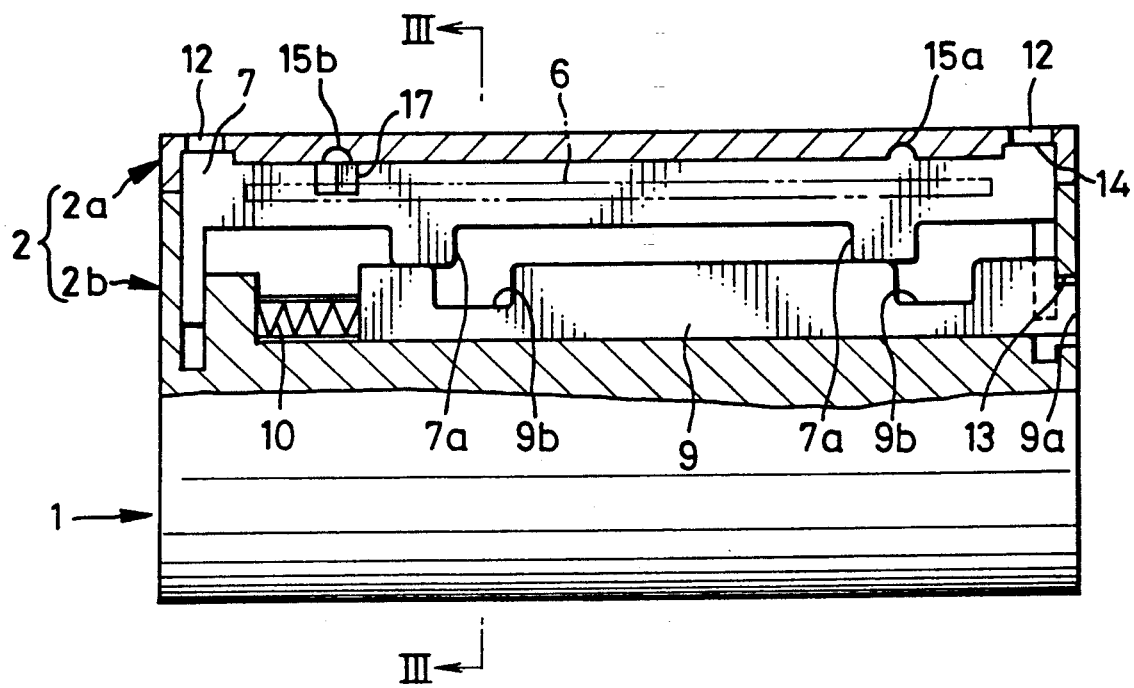
FIG. 2 is a sectional elevation view of the photographic film cassette shown in FIG. 1, wherein a shutter is in a closed position.
Figure 3:
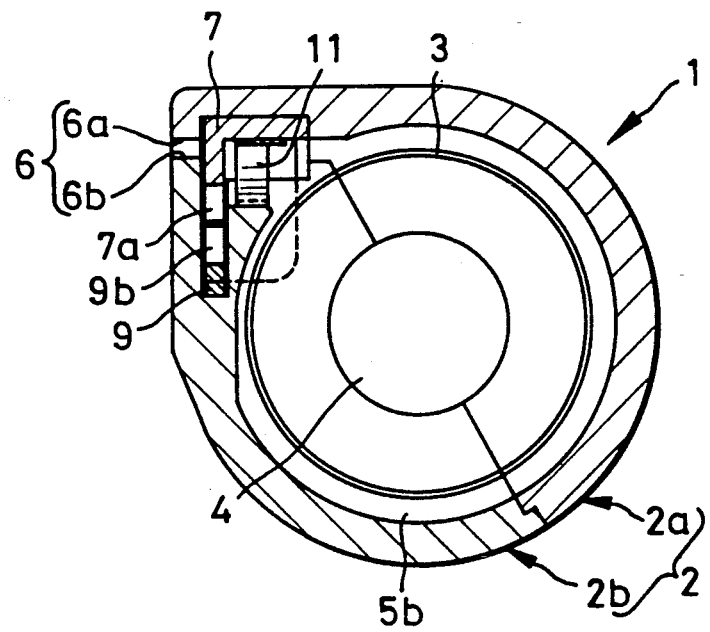
FIG. 3 is a sectional side elevation view of the photographic film cassette, taken along the III—III line in FIG. 2.
Figure 5:
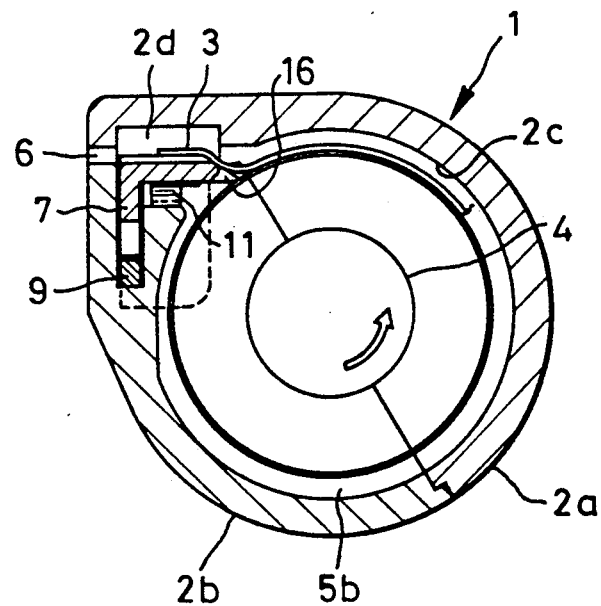
FIG. 5 is a sectional side view of the photographic film cassette, taken along the V—V line in FIG. 4.

The chamber 2c of the cassette shell 2 and a film passage mouth 6 are connected by a film passageway 2d (see FIG. 5). The film passage mouth 6 is defined by a portion 6a of the upper shell half 2a and the upper surface of a wall 6b of the lower shell half 2b. A recess 8 is formed in the wall 6b and shutter 7 is disposed therein so as to be movable in up and down directions (as illustrated in FIG. 1). A lock member 9 is positioned under the shutter 7 to restrict movement of the shutter 7. FIGS. 2 and 3 illustrate a state wherein the shutter 7 is in a closed position. Projections 7a formed on the shutter 7 are in contact with upper surfaces of the lock member 9 to lock the shutter 7. The lock member 9 is movable in the lateral direction (in FIG. 2) in the recess 8 and is urged by a spring 10 toward the right in FIG. 2. Furthermore, the shutter 7 is urged, by a leaf spring 11, toward the closed position.

Figure 4:
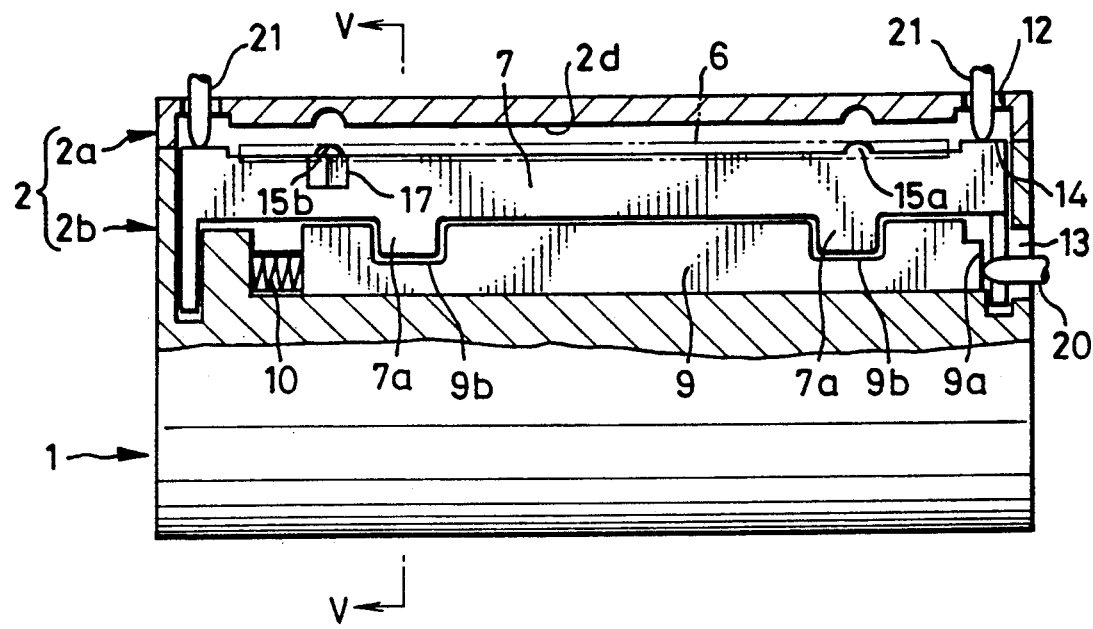
FIG. 4 is a sectional elevation view of the photographic film cassette as shown in FIG. 1, wherein the shutter is in an opened position.

As illustrated in FIG. 4, a lock release pin 20 and a pair of shutter opening pins 21 which are provided in a camera (see FIG. 9) press the lock member 9 and the shutter 7 through a hole 13 in the right side face of the shell half 2b and holes 12 in an upper portion of the shell half 2a, respectively, in order to shift the shutter 7 into an opened position against forces of the spring 10 and the leaf spring 11. Since the lock member 9 is shifted toward the left direction of FIG. 4 by the lock release pin 20 to cause the cutouts 9b to be in opposition to the projections 7a, the shutter 7 can be moved into the opened position, as illustrated in FIG. 5. When the shutter 7 is located in the opened position, it defines a lower portion of the film passageway 2d.

The upper surface of the shutter 7 has protrusions 14 formed thereon so as to come into contact with shutter opening pins 21 when the shutter opening pins 21 are inserted through the holes 12. A pair of ridges 15a, 15b are provided at positions inside the protrusions 14 on the upper surface of the shutter 7 so as to enable smooth advancement of the photographic film 3 as well as to protect the photographic film 3 from scratches. The ridge 15b is formed integrally with a separation claw 16 for peeling off a leading end 3a from the roll of photographic film 3. A triangular protrusion 17 formed on the shutter 7 is fitted in a triangular notch 18 formed in the shell half 2b, at a juncture of the shutter 7 and the shell half 2b at a position on a line extending along the ridge 15b. A gap between the triangular protrusion 17 and the triangular notch 18 is diagonal with respect to an advancing direction of the photographic film 3. The leading end 3a of the photographic film 3 is cut diagonally so as to make the end thereof on the side of the separation claw 16 protrude. Therefore, the leading end 3a advances first on the triangular protrusion 17, so that the leading end 3a will not enter into the gap between the linear portion 7b of the shutter 7 and the wall 6b. Also, plush may be attached to inside surfaces of the film passage mouth 6.

Figure 9:
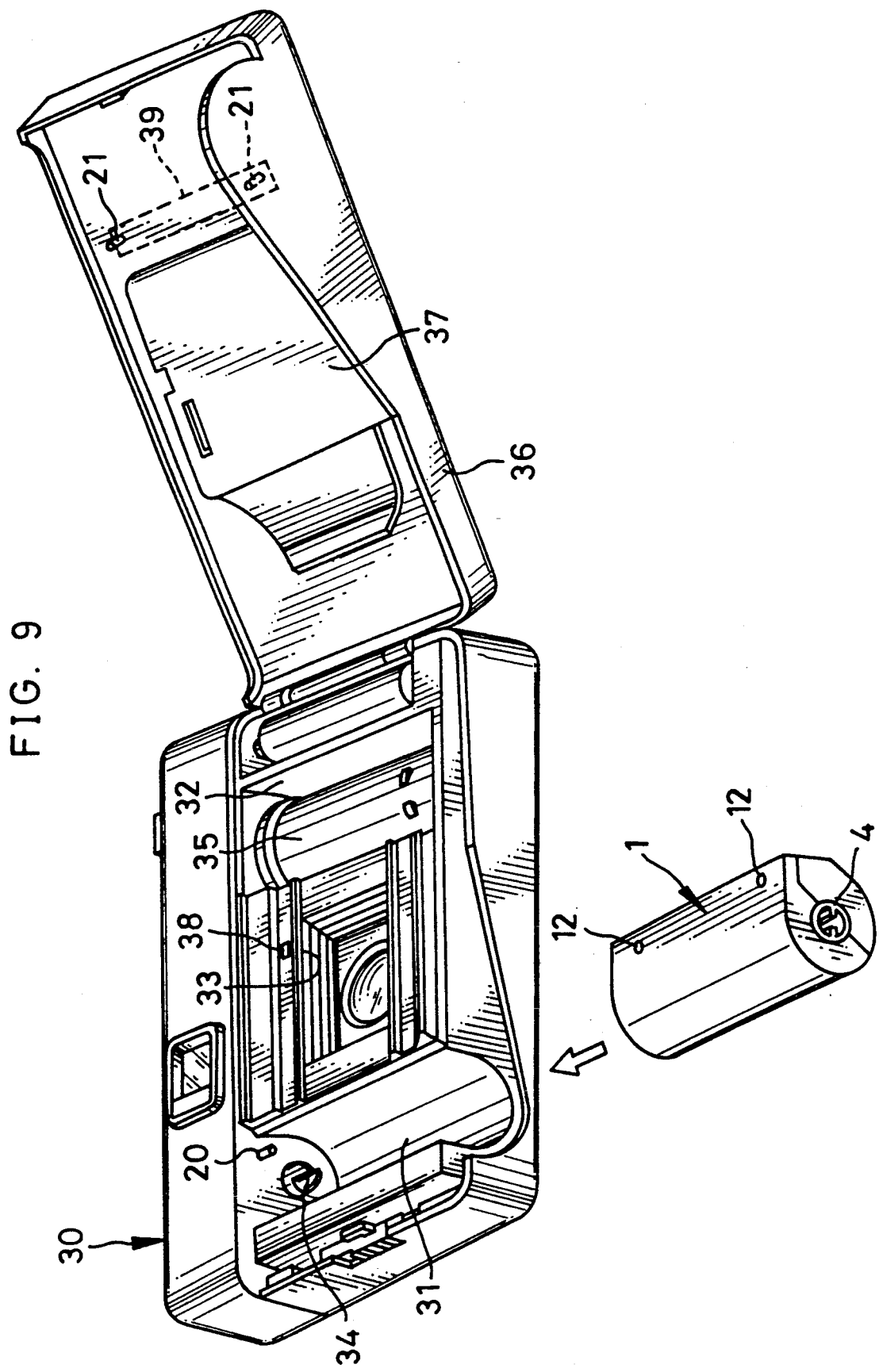
FIG. 9 is a perspective view illustrating the state when the photographic film cassette is loaded in a camera.

As illustrated in FIG. 9, a camera 30 has a cassette receiving chamber 31, a film take-up chamber 32 and an exposure chamber 33. The cassette receiving chamber 31 is provided with the lock release pin 20 and a fork 34 to be coupled with the spool 4. A film take-up spool 35 is rotatably disposed in the film take-up chamber 32 for capturing the leading end 3a and winding the photographic film 3 thereon. A rear cover 36 is swingably provided on the rear of the camera 30 and has the shutter opening pins 21 and a pressure plate 37 disposed thereon.

The operation of the above-structured photographic film cassette 1 will now be described. The shutter 7 is always in the closed position except when the photographic film cassette 1 is loaded in the camera 30. As illustrated in FIG. 2, the lock member 9 is urged by the spring 10 toward the right direction and a right end portion 9a is inserted in the hole 13. At this time, projections 7a formed on the shutter 7 cannot enter into cutouts 9b formed in the lock member 9, so that the shutter 7 is retained at the closed position. As illustrated in FIG. 3, the shutter 7 shields the film passage mouth 6 lighttightly, when in the closed position, and will not move even if vibration or shock is imparted thereto during transportation.

When loading the photographic film cassette 1 into a cassette receiving chamber 31 of the camera 30 as illustrated in FIG. 9, the lock release pin 20 provided in the cassette receiving chamber 31 enters through the hole 13 to push the right end portion 9a of the lock member 9 against the force of the spring 10. The lock member 9 thus shifts to a position where the cutouts 9b are in opposition to the projections 7a. At this time, the fork 34 of the camera 30 is coupled with an axial end of the spool 4. However, the shutter 7 is still biased, by the leaf spring 11, to the closed position. When the rear cover 36 of the camera 30 is closed, the shutter opening pins 21, provided on the rear cover 36, enter through the holes 12 of the shell half 2a to press the protrusions 14 of the shutter 7. The shutter 7 is thus pushed down against the force of the leaf spring 11 to cause the projections 7a to enter into the cutouts 9b. At this time, as illustrated in FIG. 5, the separation claw 16 is moved into contact with the outermost turn of the roll of photographic film 3.

When the spool 4 is driven by the fork 34 in a counterclockwise direction in FIG. 5, the roll of photographic film 3 is rotated together with the spool 4. When the leading end 3a of the roll of photographic film 3 reaches the separation claw 16, it is peeled off by the separation claw 16, led to the film passage mouth 6 through the film passageway 2d, and fed out of the film housing 2.

Figure 6:
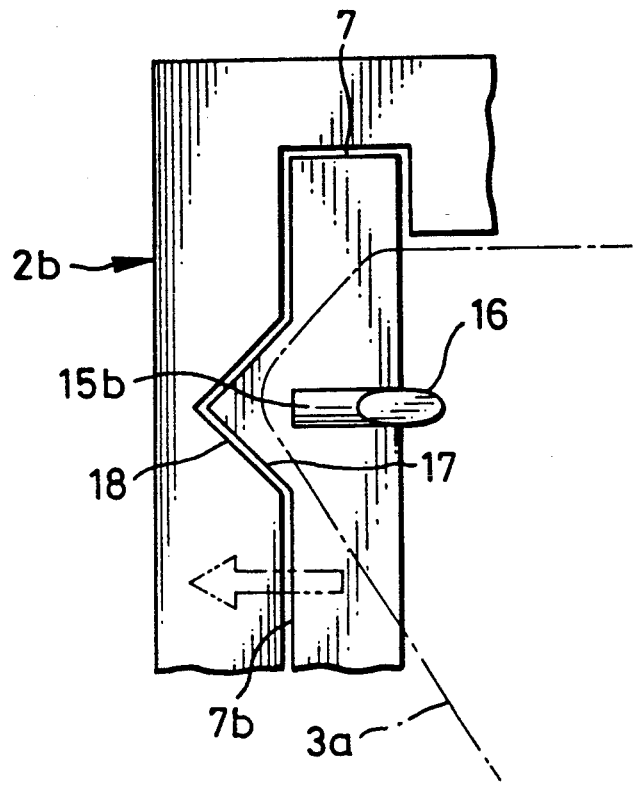
FIG. 6 is an explanatory view illustrating the structure of the boundary between the shutter and a lower cassette shell.

As illustrated in FIG. 6, the diagonally cut leading end 3a passes over the triangular protrusion 17 of the shutter 7 when passing the juncture of the shutter 7 and the shell half 2b. Therefore, the leading end 3a will never enter the gap between the shutter 7 and the shell half 2b due to the oblique angle of walls of groove 18.

Of course, the wall 6b is formed so as not to be higher than the shutter 7 in the opened position.

Figure 7:
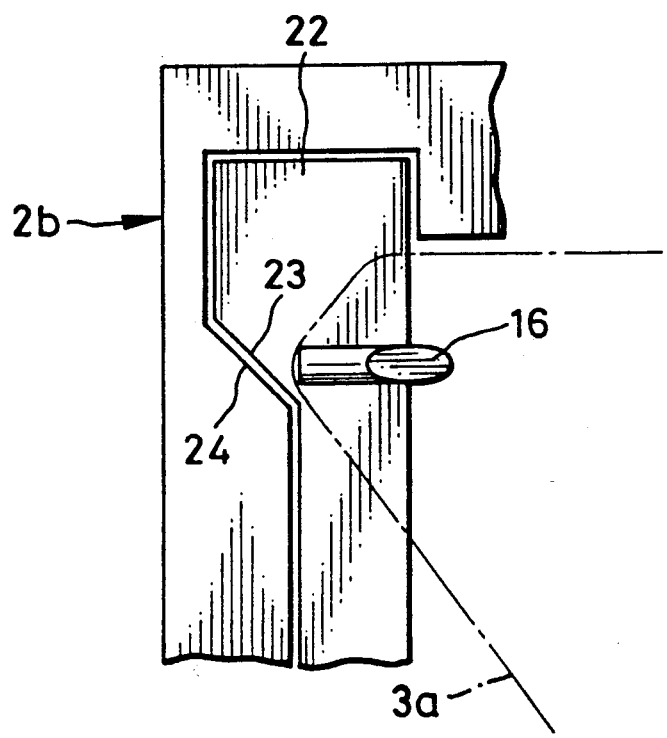
FIG. 7 is an explanatory view of a second preferred embodiment of the invention.

FIG. 7 illustrates a second preferred embodiment. Instead of the triangular protrusion 17, a shutter 22 is provided with an inclined surface 23 which serves the same purpose as triangular protrusion 17.

The leading end 3a is advanced to a film take-up spool 35 of the camera 30 by drive of the spool 4. Since the film take-up spool 35 is rotated in the same direction as the spool 4 and rotates at a peripheral speed faster than the speed of the leading end 3a, the photographic film 3 is drawn from the photographic film cassette 1 by rotation of the film take-up spool 35 after the leading end 3a is caught by the film take-up spool 35.

Figure 8:
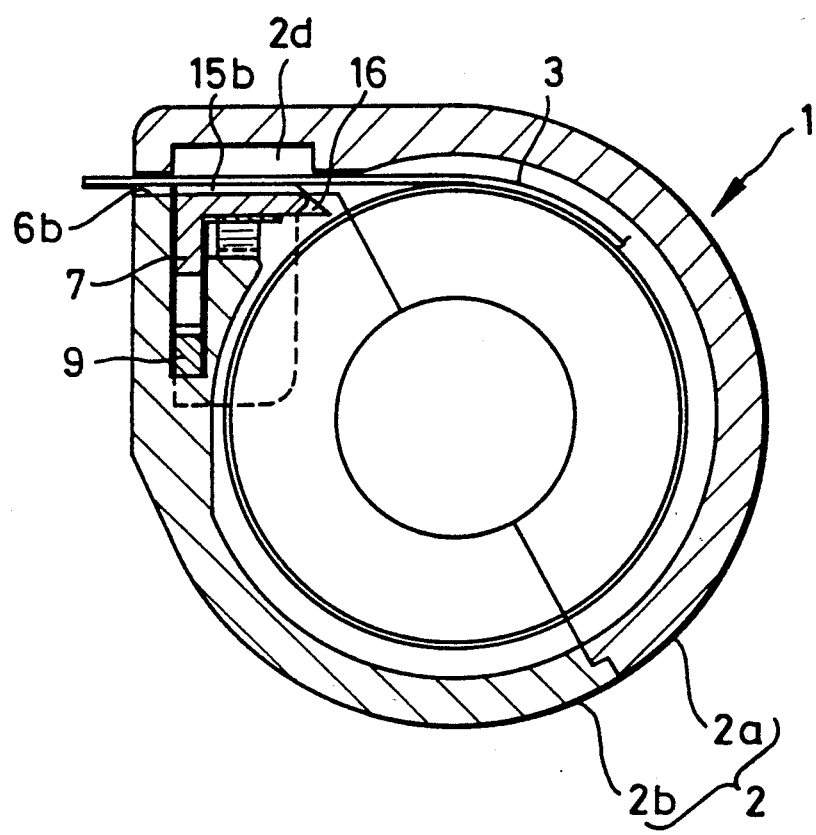
FIG. 8 is a sectional side elevation view of the photographic film cassette shown in FIG. 1, wherein the shutter is slightly raised by a mechanism of a camera from the state in FIG. 5.

When the leading end 3a is advanced out of the photographic film cassette 1 and a photosensor 38, disposed in camera 30, detects that the leading end 3a reaches a predetermined position in a film passageway of the camera 30, the shutter opening pin 21 is raised slightly upward by a mechanism 39 of the camera 30. Consequently, as illustrated in FIG. 8, the separation claw 16 is slightly spaced apart from the outermost turn of the roll of photographic film 3 while the film passage mouth 6 is kept open enough for the photographic film 3 to pass therethrough. When the separation claw 16 is spaced apart from the roll of photographic film 3 after the leading end 3a is advanced out of the photographic film cassette 1, separation claw 16 an advancing load of the photographic film 3 is reduced, and the photographic film 3 is not damaged by contact with the separation claw 16.

After all available frames of the photographic film 3 are exposed, the spool 4 is rotated by the fork 34 in a film winding direction to cause the exposed photographic film 3 to be rewound into the photographic film cassette 1 up to the leading end 3a. Thereafter, when the rear cover 36 of the camera 30 is opened, the shutter opening pins 21 are retracted from the holes 12, so that the pressing of the shutter 7 is released. Thereby, the shutter 7 is returned to the closed position due to the force of the leaf spring 11, as illustrated in FIG. 3, to close the film passage mouth 6 of the photographic film cassette 1. When removing the photographic film cassette 1 from the camera 30, the lock release pin 20 is retracted from the hole 13 to cause the lock member 9 to return to a lock position due to the force of the spring 10, as illustrated in FIG. 2.

It is preferable to use a plastic material for the cassette shell 2 and the spool 4 in consideration of productivity and cost. In particular, it is desirable to use a thermoplastic resin such as polystyrene resin, ABS resin, polyolefin resin, etc., since thermoplastic resin is injection moldable and inexpensive. It is especially desirable to use a thermoplastic resin such as high-impact-resistant polystyrene, various polypropylene resins, or a compound resin blended of various polypropylene resins. For example, ethylene copolymer and rubber. The thermoplastic resins include a light-shielding substance.

It is necessary to add a light-shielding substance in order to obtain a light-shielding characteristic. Carbon black is suitable as a light-shielding substance since it is inexpensive, has no adverse effect on photographic film and has a good light-shielding ability. In the present invention, o furnace carbon black is preferable in respect to light-shielding ability, cost and enhancement of material characteristics. Although acetylene carbon black, modified by-product carbon black and ketschen carbon black are a little more expensive, these products are also preferable since they have an antistatic effect. When adding a light-shielding substance to a polyethylene system polymer as above, a masterbatch method is suitable in terms of cost, prevention of contamination in the factory, and so forth.

In the above embodiment, the shutter and the lock member are accessed directly from the outside of the photographic film cassette, but in the alternative, an operational mechanism which can be operated from the outside of the photographic film cassette may be provided so as to move the shutter and the lock member.

Although the present invention has been fully described by way of preferred embodiments thereof with reference to the accompanying drawings, various changes and modifications will be apparent to those having skill in the art. Therefore, unless otherwise these changes and modifications depart from the scope of the present invention, as defined by the appended claims, they should be construed as included therein.

What is claimed is:

1. A photographic film device having a cassette shell, which consists of upper and lower shell halves, and a spool which is contained rotatably in a chamber of said cassette shell and has a photographic film wound thereon in a roll, a leading end of said photographic film being advanced to the outside of said chamber of said cassette shell through a film passage mouth by rotation of said spool, said device comprising:

a shutter slidingly disposed in a recess formed in said lower shell half of said cassette shell so as to be movable between a closed position and an opened position, said film passage mouth being closed so as to prevent external light from entering said film housing when said shutter is in the closed position and said film passage mouth being open so as to enable advancement of said photographic film when said shutter is in the opened position; and first and second ridges provided on both lateral ends of an upper surface of said shutter, along which said photographic film passes as said photographic film advances out of said cassette shell, so as to prevent said photographic film being damaged.

2. A photographic film device as recited in claim 1, further comprising:

a resilient member disposed between said cassette shell and said shutter so as to bias said shutter toward the closed position.

3. A photographic film device as recited in claim 2, further comprising:

a separation claw formed on said shutter for stripping said leading end from said roll of photographic film when said spool is rotated, said separation claw contacting an outermost turn of said roll of photographic film when said shutter is in the opened position.

4. A photographic film device as recited in claim 3, wherein said separation claw is formed integrally with said first ridge.

5. A photographic film device as recited in claim 4, wherein said shutter is flush with a surface of a film passageway connecting said chamber and said film passage mouth when said shutter is in the opened position, and a portion of a juncture between a lower wall of said film passage mouth and said shutter is inclined obliquely to extend from other portions of said juncture in an advancing direction of said photographic film, said portion intersecting a line which extends along said first ridge.

6. A photographic film device as recited in claim 5, wherein said portion of said juncture is defined by a triangular protrusion formed on said shutter and a triangular notch, which receives said triangular protrusion, formed in said lower wall.

7. A photographic film device as recited in claim 5, wherein said portion of said juncture is defined by a quadrangular protrusion, having an inclined side, formed on said shutter and a cutout, for receiving said quadrangular protrusion, formed in said lower wall.

8. A photographic film device as recited in claim 3, further comprising:
a lock device operatively coupled to said shutter, said lock device being movably mounted in said cassette shell so as to be shiftable between a lock position, where said shutter is fixedly locked in the closed position, due to abutment against said lock device, and an unlock position where said shutter is movable.

9. A photographic film device as recited in claim 8, further comprising:
a second resilient member disposed between said cassette shell and said lock device so as to bias said lock device toward the lock position.

10. A photographic film device, as recited in claim 9, wherein one of said shutter and said lock device is formed with at least one cutout while the other is formed with at least one protrusion, when said lock device is in the unlock position, said cutout and said protrusion are in opposition to each other so as to allow said protrusion to enter said cutout and thus allow said shutter to move to the opened position.

11. A photographic film device as recited in claim 9, said cassette shell having at least one first hole formed therein, at least one lock releasing pin provided on an associated camera enters said first hole and comes into contact with said lock device to shift said lock device from the lock position to the unlock position.

12. A photographic film device as recited in claim 11, said cassette shell having at least one second hole formed therein, at least one shutter opening pin provided on a rear cover of said camera enters said second hole so as to contact said shutter and move said shutter from the closed position to the opened position when said cover is closed.

13. A photographic film device having a cassette shell and a spool rotatably contained in a chamber of said cassette shell, said spool having a photographic film wound thereon in a roll, a leading end of said photographic film being advanced to the outside of said chamber of said cassette shell through a film passage mouth when said spool is rotated, said device comprising:
a shutter movably mounted in said cassette shell so as to be movable between a closed position and an opened position, said film passage mouth being closed so as to prevent external light from entering said chamber when said shutter is in the closed position and said film passage mouth being opened so as to enable advancement of said photographic film through said film passage when said shutter is in the opened position, a leading end of said photographic film being cut diagonally with respect to a direction of advancement thereof so as to cause one portion thereof to protrude and a portion of a juncture between said shutter and a lower wall of said film passage mouth being formed obliquely to extend from other portions of said juncture in a film advancing direction, said portion of said juncture corresponding to a position by which said one portion of the leading end of said photographic film passes.

14. A photographic film device as recited in claim 13, wherein said portion of said juncture is defined by a triangular protrusion formed on said shutter and a triangular notch which is formed in said lower wall so as to receive said triangular protrusion.

15. A photographic film device as recited in claim 13, wherein said portion of said juncture is defined by a quadrangular protrusion, having an inclined side formed on said shutter and a cutout formed in said lower wall so as to receive said quadrangular protrusion.

16. A photographic film device having a cassette shell and a spool which is rotatably contained in a chamber of said cassette shell and has a photographic film wound thereon in a roll, a leading end of said photographic film being advanced to the outside of said chamber of said cassette shell through a film passage mouth when said spool is rotated, said device comprising:
a shutter movably mounted in said cassette shell so as to be movable between a closed position and an opened position, said film passage mouth being closed so as to prevent external light from entering when said shutter is in the closed position and said film passage mouth being opened so as to enable advancement of said photographic film through said film passage when said shutter is in the opened position; and
a lock device operatively coupled to said shutter for locking said shutter in the closed position, said lock device being movably mounted in said cassette shell so as to be shiftable between a lock position where said shutter is fixedly locked in the closed position due to abutment against said lock device and an unlock position where said shutter is movable.

17. A photographic film device as recited in claim 16, wherein one of said shutter and said lock device has at least one cutout formed therein while the other has at least one protrusion formed thereon, when said lock device is in the unlock position, said cutout and said protrusion are in opposition to each other so as to allow said protrusion to enter said cutout and thus allow said shutter to move to the opened position.

18. A photographic film device as recited in claim 17, said cassette shell having at least one first hole formed therein, at least one lock releasing pin provided on an associated camera enters said first hole so as to contact said lock device and shift said lock device from the lock position to the unlock position.

19. A photographic film device, as recited in claim 18, said cassette shell having at least one second hole formed therein, at least one shutter opening pin provided on a rear cover of said camera enters said second hole so as to contact said shutter and move said shutter from the closed position to the opened position when said cover is closed after said cassette has been loaded in said camera.

* * * * *